United States Patent [19]
Zellmer

[11] Patent Number: 4,501,254
[45] Date of Patent: Feb. 26, 1985

[54] DEVICE FOR CONTROLLING THE TEMPERATURE OF THE INTAKE AIR TO AN INTERNAL COMBUSTION ENGINE

[75] Inventor: Michael Zellmer, Torslanda, Sweden
[73] Assignee: AB Volvo, Goteborg, Sweden
[21] Appl. No.: 553,351
[22] Filed: Nov. 18, 1983

[30] Foreign Application Priority Data
Dec. 3, 1982 [SE] Sweden ................. 8206925

[51] Int. Cl.³ .................................. F02M 31/00
[52] U.S. Cl. .......................... 123/556; 123/552
[58] Field of Search .................... 123/556, 552; 236/101 C, 86, 101 E, 87

[56] References Cited
U.S. PATENT DOCUMENTS

| | | | |
|---|---|---|---|
| 1,448,008 | 3/1923 | Smith | 123/122 |
| 2,058,204 | 10/1936 | Ball | 123/556 |
| 2,781,032 | 2/1957 | Sebok | 123/556 |
| 4,112,896 | 9/1978 | Akado | 123/556 |
| 4,178,898 | 12/1979 | Akado | 123/556 |
| 4,313,561 | 2/1982 | Kenny | 236/86 |

Primary Examiner—Ronald H. Lazarus
Attorney, Agent, or Firm—Young & Thompson

[57] ABSTRACT

In a device for controlling the temperature of the intake air to an internal combustion engine, the piston of a hydraulic cylinder controls the setting of a damper between the warm-air intake and the cold-air intake. A sensor body in the mixed-air duct communicates, via a hydraulic conduit, with the cylinder. The sensor body is filled above a free piston with an expansion medium of higher coefficient of thermal expansion than the hydraulic medium on the opposite side of the free piston. By allowing the temperature in the engine compartment, for example, to determine the temperature of the hydraulic conduit, the control interval is displaced so that the temperature of the intake air is higher when the engine is cold than when it is warm.

4 Claims, 2 Drawing Figures

DEVICE FOR CONTROLLING THE TEMPERATURE OF THE INTAKE AIR TO AN INTERNAL COMBUSTION ENGINE

The present invention relates to a device for controlling the temperature of the intake air to an internal combustion engine, comprising an operating element for controlling the setting of a damper between an inlet for cold air and an inlet for heated air to a mixed-air duct for the intake air, a sensor body placed in the mixed-air duct in the form of a vessel which contains an expansion medium and a fluid conduit which establishes communication between the sensor body and a fluid chamber in the operating element, said chamber containing a movable means for controlling the damper setting depending on the volume in the chamber.

In known control devices of this type, the sensor body is connected to the operating element via a capillary tube containing the same expansion medium as the sensor body. When the measuring location and the control location are spaced relatively far apart in the engine compartment, the temperature of the space surrounding the capillary tube, which differs from the temperature in the air intake duct, will have a great effect on the control process, resulting in error in control. A known solution to this problem is to arrange a compensation system which has an operating element mechanically coupled to the proper operating element and acting in the opposite direction. Another solution is to eliminate the long capillary tube and arrange a wire control between the measuring point and the control point.

The purpose of the present invention is to achieve a control device of the type described by way of introduction, which eliminates the need for a compensating system to compensate for the effect of the temperature of the surrounding space on the control function, and which instead uses this temperature as a parameter for control adjustment of the temperature of the intake air to the temperature of the engine.

This is achieved according to the invention by means of a second sensor body coupled in series between the sensor body in the mixed-air duct and the chamber of the operating element, said second sensor body being disposed outside the mixed-air duct and at least mostly filled with an expansion medium of lower coefficient of thermal expansion than the expansion medium in the first sensor body.

This second sensor body achieves a controlled displacement upwards or downwards of the predetermined temperature interval of the intake air which is detected by the first sensor body. When the second sensor body detects a low surrounding temperature for example, which means that the engine is cold, the intake air temperature will be raised until the engine is thoroughly warmed up, thereby preventing condensation of fuel on the cold walls of the intake pipe and the preheating chamber. When the engine has been warmed up, there will be a return to the nominal control temperature.

In the simplest embodiment of the invention, the second sensor body can be made of a simple conduit between the first sensor body and the operating element, in order to detect the temperature in the engine compartment itself. Alternatively, the conduit can be made with a special container portion which can be mounted in a coolant duct or in the fuel line for example.

The invention will be described in more detail below with reference to examples shown in the accompanying drawing.

Figure 1:
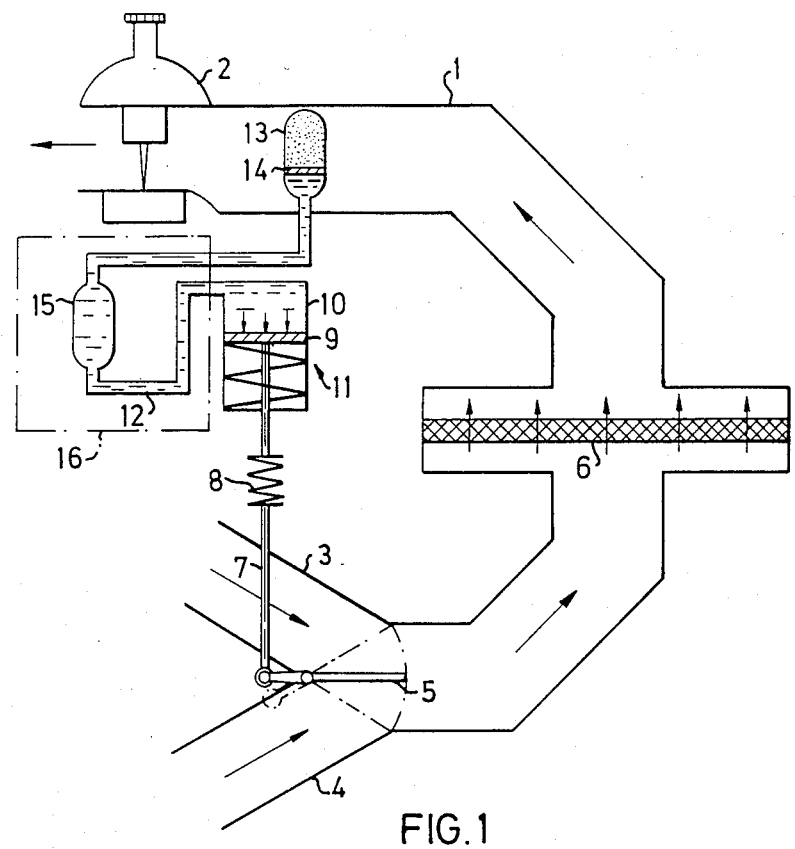
FIG. 1 shows a schematic diagram of the temperature control device.

In FIG. 1, 1 designates a duct for intake air to a carburettor 2. An inlet 3 for air heated by the exhaust pipe jacket for example, and an inlet 4 for unheated fresh air lead to the duct 1. Between the inlets 3 and 4, there is a damper 5 which controls the proportion of heated to unheated air to the duct 1. In the duct 1 there is an air filter 6 which produces an homogenization of the stratified intake air in front of the filter.

The damper 5 is connected via a double piston rod 7 and an overflow spring 8, to a piston 9 in a cylinder 10, forming together an operating element 11. The cylinder 10 communicates via a conduit 12 with a vessel 13 in the intake duct 1. In the vessel 13, which forms a sensor body, a movable wall is arranged in the form of a freely movable piston 14. The vessel is made of a thin-walled material with high thermal conductivity, e.g. copper or brass, and is filled in the space above the piston 14 with an expansion medium of high coefficient of thermal expansion, preferably a medium having a melting point at the desired control temperature, e.g. wax, which expands rapidly at the melting point. The cylinder 10 of the operating element 11 and the conduit 12 are filled with a medium of lower coefficient of thermal expansion than the wax, e.g. a mixture of water and glycol, which also withstands low temperatures without freezing. The conduit 12 has a portion 15 of larger diameter which forms a container to increase volume.

The framed area 16 can be the engine compartment itself, a coolant duct or a fuel line. At low temperature in any of these, the medium in the conduit 12 has its smallest volume. The piston 9 is an upper end-position and keeps the cold-air intake 4 closed until the air in the air duct 1 has reached a temperature which causes the expansion medium in the sensor body 13 to expand sufficiently to begin moving the piston 9 downwards and open the cold-air intake 4. The lower the temperature which the surrounding space has, the more the medium in the sensor body must expand to achieve a specific piston displacement with accompanying damper movement, and the higher the air temperature in the duct 1 will be. When the temperature of the surrounding space increases, the volume of the medium in the conduit 12 increases, which means that a lower temperature of the intake air will be required to produce the same damper movement. Consequently, the air temperature will be controlled at a lower level for a warm engine than for a cold engine.

Figure 2:
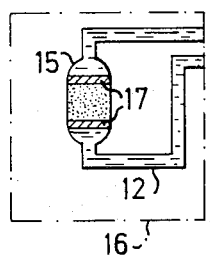
FIG. 2 shows a detail from FIG. 1 in a modified embodiment.

The change in level of the control interval depends, among other things, on the volume of the conduit 12 and its compensation vessel 15, and on the coefficient of thermal expansion of the medium. If a greater change in the control interval is desired than what can be achieved with the embodiment shown in FIG. 1, the vessel 15 can be modified as shown in FIG. 2. Here the vessel is provided with a pair of free pistons 17, and between them the vessel is filled with an expansion medium of higher coefficient of thermal expansion than the medium in the conduit itself. In this way, a more controlled and defined effect of the surrounding space on the control can be achieved. Membranes can be used instead of the pistons 9, 14 and 17.

What I claim is:

1. In an internal combustion engine with an air heater, a temperature-controlling air intake device comprising a damper, an inlet for cold air, an inlet for heated air, a mixed air duct, and an operating element in said mixed air duct controlling the setting of said damper between said cold and heated air inlets; the improvement in which said element comprises a fluid chamber comprising movable means controlling the damper setting depending on the volume of the chamber; a first expansion medium, a second expansion medium of lower coefficient of thermal expansion than the said first medium, a vessel located in the mixed air duct, said vessel containing said first expansion medium; a fluid conduit extending outside the mixed air duct and establishing communication between said vessel and said fluid chamber, said conduit containing said second expansion medium, said first and second expansion media being so disposed relative to each other that expansion and contraction of said first medium are transmitted by said second medium to said movable means, the relatively low coefficient of thermal expansion of said second medium reducing the influence on the position of the damper of temperature outside the mixed air duct.

2. Device according to claim 1, in which the first expansion medium in the vessel and the second expansion medium in the conduit are separated by a wall movable in the vessel.

3. Device according to claim 1, in which the fluid conduit is formed of a thin tube which, at least at one location, has a portion of enlarged cross section, said portion forming a container for a compensation volume expansion medium.

4. Device according to claim 3, in which the container for the compensation volume comprises a pair of movable, spaced walls, and a third expansion medium of higher coefficient of thermal expansion than the said second expansion medium, such that the space between said spaced walls contains said third expansion medium.

* * * * *